United States Patent
Hino

(10) Patent No.: US 7,137,424 B2
(45) Date of Patent: Nov. 21, 2006

(54) TIRE USED IN WINTER HAVING PAIR OF RIB PORTIONS AND CENTRAL VERTICAL GROOVE WITH SAW-TOOTH SHAPE

(75) Inventor: Hidehiko Hino, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 114 days.

(21) Appl. No.: 10/398,777

(22) PCT Filed: Aug. 12, 2002

(86) PCT No.: PCT/JP02/08233

§ 371 (c)(1),
(2), (4) Date: Apr. 9, 2003

(87) PCT Pub. No.: WO03/018333

PCT Pub. Date: Mar. 6, 2003

(65) Prior Publication Data

US 2003/0192634 A1    Oct. 16, 2003

(30) Foreign Application Priority Data

Aug. 22, 2001 (JP) ............................. 2001-251930

(51) Int. Cl.
  *B60C 11/12*   (2006.01)
(52) U.S. Cl. ............................. 152/209.2; 152/209.18; 152/DIG. 3
(58) Field of Classification Search ............. 152/209.2, 152/209.18, 209.26, DIG. 3, 900, 901
See application file for complete search history.

(56) References Cited

U.S. PATENT DOCUMENTS 4,926,919 A * 5/1990 Hopkins et al. ....... 152/DIG. 3
5,785,780 A * 7/1998 Ochi ...................... 152/DIG. 3
6,250,354 B1 * 6/2001 Kawai ................... 152/DIG. 3

FOREIGN PATENT DOCUMENTS

| DE | 19711607 A1 | 12/1997 |
| DE | 19826927 | * 12/1998 |
| EP | 330644 | * 8/1989 |
| EP | 713790 | * 5/1996 |
| JP | 53-22883 Y1 | 6/1978 |
| JP | 62-255204 | * 11/1987 |
| JP | 3-38409 A | 2/1991 |

(Continued)

OTHER PUBLICATIONS

Machine translation for Europe 713790.*

(Continued)

*Primary Examiner*—Steven D. Maki
(74) *Attorney, Agent, or Firm*—Birch, Stewart, Kolasch & Birch, LLP

(57) ABSTRACT

A winter tire containing a central vertical groove which extends along a tire equator C, and rib portions 6a and 6b having sipes S are formed on the opposite sides of the central vertical groove. At a groove edge line 3E of the central vertical groove, reference pitches P each comprises a main portion extending from an outermost origin N1 in a tire axial direction to a terminal end N2 closest to the tire equator, and an auxiliary portion 3b having a length in the tire circumferential direction smaller than that of the main portion 3a and passes through said origin N1 from said terminal end N2, and the reference pitches P are repeated in the tire circumferential direction into a zigzag configuration. A tire circumferential direction length of the main portion is 60% or more of a tire circumferential direction length of the reference pitch P.

14 Claims, 10 Drawing Sheets

FOREIGN PATENT DOCUMENTS

| | | | |
|---|---|---|---|
| JP | 3-125606 | * | 5/1991 |
| JP | 3-139402 | * | 6/1991 |
| JP | 10-24707 A | | 1/1998 |
| JP | 10-100617 | * | 4/1998 |
| JP | 11-123909 | * | 5/1999 |
| JP | 2000-219014 A | | 8/2000 |

OTHER PUBLICATIONS

Machine translation for Japan 10-100617.*

Microfilm of the specification and drawings annexed to the request of Japanese Utility Model Application No. 43063/1985 (Laid-Open No. 159203/1986) (Bridgestone Corp.) Oct. 2, 1986.

* cited by examiner

TIRE USED IN WINTER HAVING PAIR OF RIB PORTIONS AND CENTRAL VERTICAL GROOVE WITH SAW-TOOTH SHAPE

This application is the national phase under 35 U.S.C. § 371 of PCT International Application No. PCT/JP02/08233 which has an International filing date of Aug. 12, 2002, which designated the United States of America.

FIELD OF THE INVENTION

The present invention relates to a winter tire capable of enhancing driving-in-snow performance.

BACKGROUND ART

In the case of a pneumatic tire used on a snowy road and a frozen road in winter ("winter tire", hereinafter), emphasis is placed on driving performance on an especially slippery frozen road. More specifically, there is employed a method in which the land ratio of a tread surface is increased to increase the ground-contact area, or there is employed a method in which the tread central portion having a long ground-contact length in the tire circumferential direction is formed with a rib-like land on which a sipe is disposed. In any of these methods, however, the driving-in-snow performance, especially the driving performance in deep snow is prone to deterioration.

The present invention has been accomplished in view of the above-mentioned problem, and it is thus an object of the present invention to provide a winter tire capable of preventing a deterioration in the driving performance on frozen roads and, in fact, capable of enhancing the driving-in-snow performance, especially the driving performance in deep snow.

DISCLOSURE OF THE INVENTION

The tire of the present invention provides a winter tire containing a tread surface which is provided with a central vertical groove continuously extending along the tire equator in the tire circumferential direction, the central vertical groove being formed at its opposite sides with rib portions having sipes, said rib portions continuously extending substantially in the tire circumferential direction.

The opposite side groove edge lines, where the groove wall surfaces on opposite sides of the central vertical groove intersect with the tread surface includes an inclining component which inclines with respect to the tire circumferential direction.

The groove wall surfaces contain reference pitches comprising
  main portions extending from an origin which is at the outermost side in the tire axial direction to a terminal end which is closest to the tire equator, and
  auxiliary portions having a length in the tire circumferential direction which is shorter than that of the main portion and extending from the terminal end on a line in the tire circumferential direction passing through the origin the main and auxiliary portions are repeatedly formed along the central groove.
  the length of the main portion in the tire circumferential direction is 60% or higher than a length of the reference pitch in the tire circumferential direction.
  The auxiliary portion comprises only an axial direction component which extends in the tire axial direction so that the groove edge line has a saw-tooth shape.
  In the opposite side the groove edge lines, the tire circumferential direction lengths of the reference pitches are the same, and the main portions are inclined in the same direction, phase of the reference pitch is deviated in position in the tire circumferential direction,
  groove width wide portions formed between auxiliary portions which are opposed to each other in the tire circumferential direction on the opposite sides of the tire equator, and
  groove width narrow portions formed between the main portions on the opposite sides of the tire equator are alternately repeated in the tire circumferential direction,
  a minimum groove width of the groove width narrow portion is 2 to 7% of a nominal width of the tire.
  In the opposite side the groove edge lines, the tire circumferential direction lengths of the reference pitches are the same, and the main portions are inclined in the same direction, phase of the reference pitch is deviated in position in the tire circumferential direction,
  groove width wide portions formed between auxiliary portions which are opposed to each other in the tire circumferential direction on the opposite sides of the tire equator, and
  groove width narrow portions formed between the main portions on the opposite sides of the tire equator are alternately repeated in the tire circumferential direction,
  a maximum groove width of the groove width wide portion is 1.5 to 2.5 times of a minimum groove width of the groove width narrow portion.
  A length of the groove width wide portion in the tire circumferential direction is 0.2 to 0.7 times of a length of the reference pitch in the tire circumferential direction.

BEST MODE FOR CARRYING OUT THE INVENTION

An embodiment of the present invention will be explained below based on the drawings.

Figure 1:
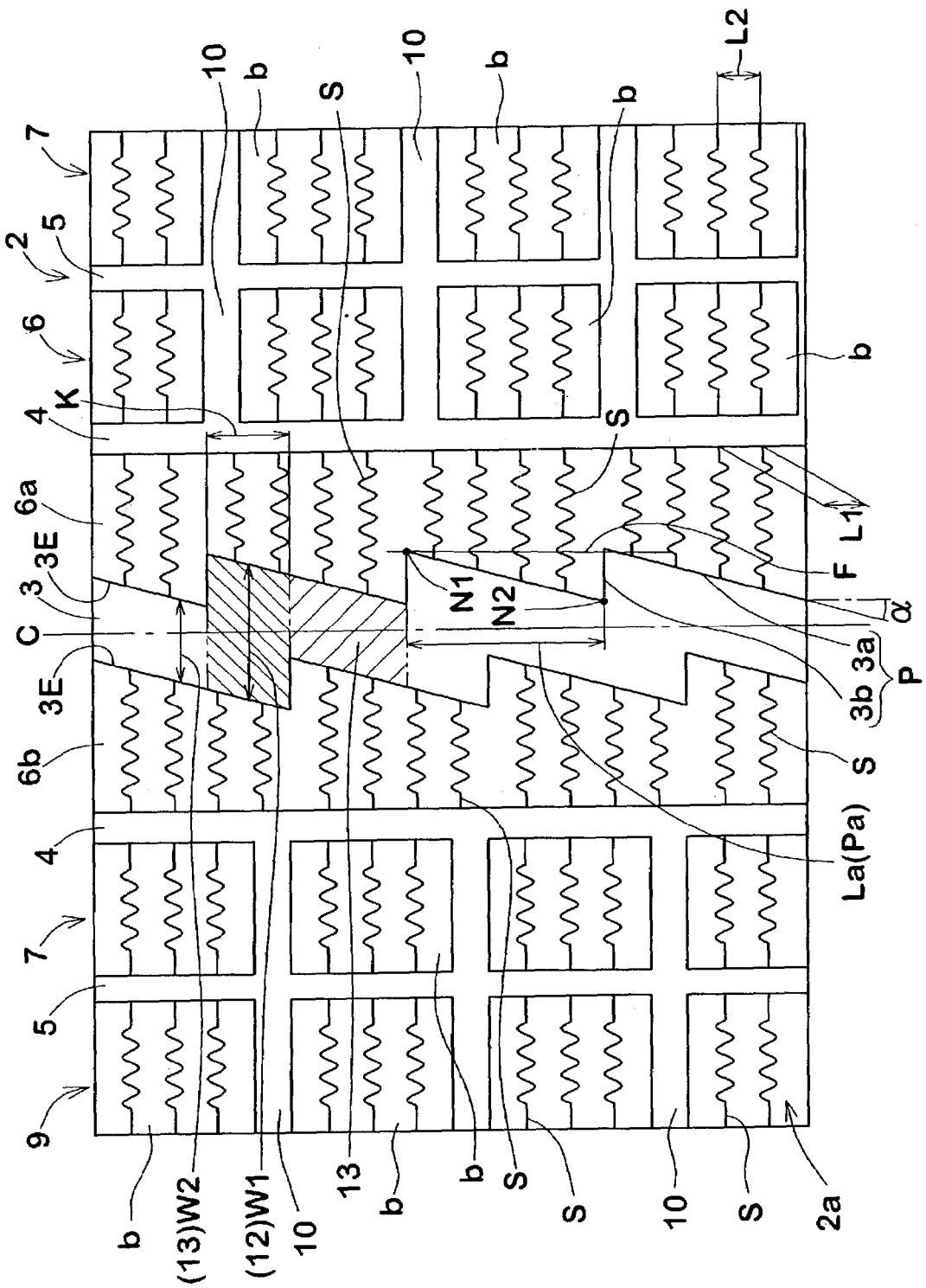
FIG. 1 is a development view of a tread pattern of a winter tire showing an embodiment of the present invention.

FIG. 1 is a view of a tread surface of a winter tire (simply "tire" hereinafter) of this embodiment. The tread surface 2 is formed with a central vertical groove 3 which continuously extends on the tire equator C in the tire circumferential direction. Inner vertical grooves 4 and outer vertical grooves 5 are formed on opposite outer sides of the central vertical groove 3.

Figure 2B:
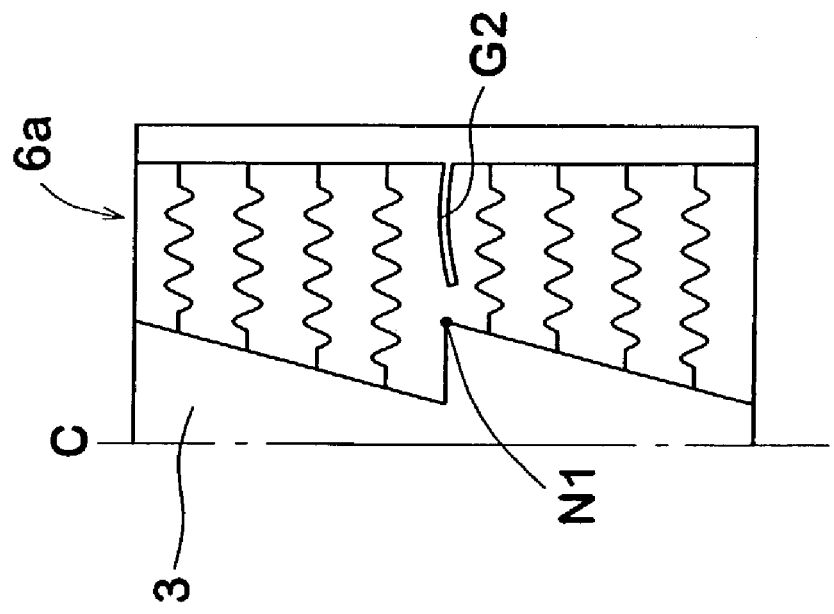
FIGS. 2(A) and (B) are partially enlarged views showing other embodiments of a rib portion.
Figure 2A:
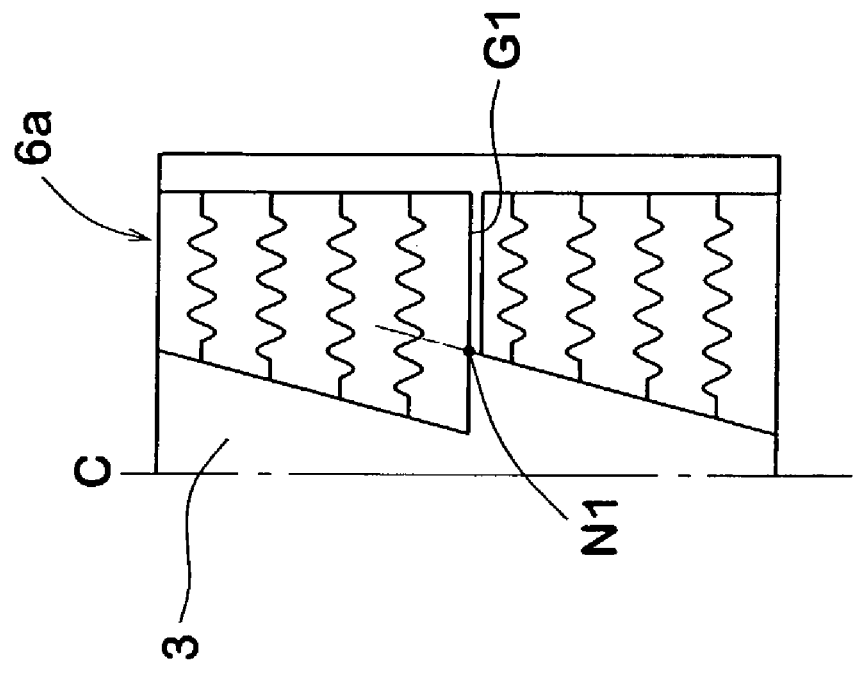

In this example, rib portions 6a and 6b which have sipes S . . . and which continuously extend substantially in the tire circumferential direction are formed between the central vertical groove 3 and the inner vertical grooves 4, respectively. The expression that the rib portions 6a and 6b are continuous substantially in the tire circumferential direction includes the case as shown in FIG. 2a, in which the land is completely divided by a thin groove G1 having a groove width of 3 mm or less which does not substantially hinder the continuity of the land, and the case as shown in FIG. 2b in which the thin groove G2 is terminated before it divides the land.

Such rib portions 6a and 6b can secure the ground-contact area in a wide range in the tire circumferential direction in the central portion of a tread surface where the ground-contact length is increased. This is of use in enhancing the driving performance on a frozen road. The width of each of the rib portions 6a and 6b in the tire axial direction is 0.05 to 0.2 times of a nominal width of the tire for example, and more preferably about 0.07 to 0.16 times. The width of each of the rib portions 6a and 6b is varied in the tire circumferential direction in some cases, and in such a case, its average width is employed. Here, "nominal width of tire" means 195 mm when a tire size is declared as "195/65R15". Block lines 7 and 9 comprising blocks b which are divided by lateral grooves 10 are formed on outer sides of the rib portions 6a and 6b, and they are not especially limited to this embodiment.

In the tire 1 of this embodiment, in order to enhance the driving performance on both the frozen road and snow road, a land ratio is set to 0.65 or higher, more preferably about 0.65 to 0.75. The land ratio is a ratio of a total area of a land portion (block, rib portion) to a total area of ground-contact region (tread ground-contact width×tire average circumferential length). If the land ratio is less than 0.65, the groove area is increased and this is advantageous for the driving performance on a snow road, but the friction force on the frozen road becomes small, and the driving performance is prone to deterioration. If the land ratio exceeds 0.75 on the other hand, the land area is increased. This is advantageous for driving performance on a frozen road, but driving performance on a snowy road is prone to deterioration.

In this example, the sipe S includes components in the tire axial direction. Sipes having a bent portion which is bent in a corrugated or zigzag shape is preferable because the edge effect can be enhanced and the driving performance on a frozen road can be enhanced. In this example, not only the rib portions 6a and 6b, but also the block b are formed with the sipes S. The pitch of the sipes S in the tire circumferential direction is not especially limited, but, for example, about 3.5 to 7.0 mm is preferable. It is preferable that sipe pitches L1 of the rib portions 6a and 6b in which ground-contact pressure is increased is set to a value smaller than the sipe pitch L2 of the block b, more preferably, a ratio (L2/L1) is set to 1.1 to 1.2, and when rigidities of the rib portions 6a and 6b are lowered, balance with respect to rigidity of the block b in the circumferential direction is enhanced, and this is advantageous for deviated wear.

As can be seen from FIGS. 1 and 4–8, the sipes S are not opened at a position of the origin.

Figure 3A:
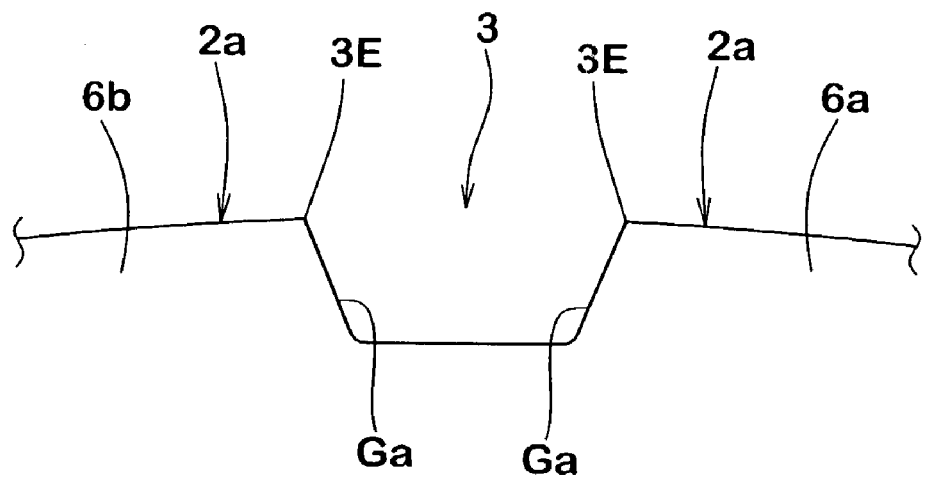
FIGS. 3(A) and (B) are sectional views for explaining a groove edge line.
Figure 3B:
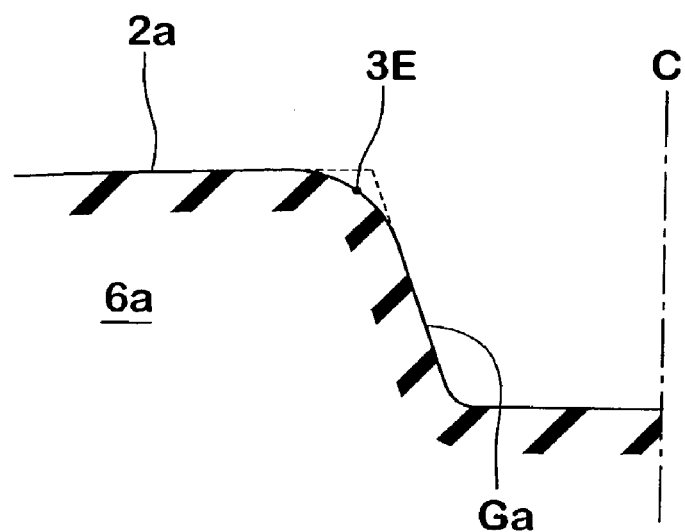

As shown in FIGS. 1 and 3(a), the groove edge line 3E, where groove wall surfaces Ga and Ga on opposite sides of the central vertical groove 3 intersect with the tread surface 2a, includes inclining components which incline with respect to the tire circumferential direction; reference pitches P including main portions 3a extending from an origin N1 which is at the outermost side in the tire axial direction to a terminal end N2 which is closest to the tire equator C; and auxiliary portions 3b having a length in the tire circumferential direction which is shorter than that of the main portion 3a and extends from the terminal end N2 on a line F in the tire circumferential direction passing through the origin N1, are repeatedly formed the length La of the main portion 3a in the tire circumferential direction is 60% or higher than the length Pa of the reference pitch P in the tire circumferential direction. As shown in FIG. 3(b), when the tread surface 2a and the groove wall surface Ga intersect with each other through an arc portion R, the groove edge line 3E is specified at an intermediate position of the arc.

Generally, behavior of the rib portions 6a and 6b in which the ground-contact pressure of the tread surface 2 is high and ground-contact length becomes great is very pertinent to an initial response when the steering wheel of a vehicle is turned (slip angle is applied to a tire). On a dry asphalt road surface having a relatively high coefficient of friction μ, the rib portions 6a and 6b are twisted between themselves and the road surface by the slip angle, and the lateral force for restoring the twist by resiliency is generated, and the initial response is enhanced.

On the other hand, on a road surface such as snow road or frozen road having a low coefficient of friction μ, since the frictional force between the road surface and the rib portions 6a and 6b is small, if the rigidity of the rib portions 6a and 6b is great, when the slip angle is applied, slip is caused before the rib portions 6a and 6b are sufficiently twisted and deformed, and the initial response deteriorates. Thus, in the present invention, the reference pitch P of the central vertical groove 3 is constructed as described above, and the rib portions 6a and 6b are provided with sipes S, and based on the above-mentioned structure, the rigidity of the rib portions 6a and 6b is lowered appropriately in accordance with an icy road, and the initial response at the time of operation of the steering wheel on a snowy road or a frozen road can be enhanced.

The main portion 3a comprises only the inclining component which, in this example, inclines with respect to the tire circumferential direction. The origin N1 of the main portion is located at the outermost side in the tire axial direction, and the terminal end N2 is located closest to the tire equator. The shape of the main portion 3a is not limited in the case where the main portion 3a includes an inclining component which inclines with respect to the tire circumferential direction, and includes the origin N1 and terminal end N2. When the main portion 3a is straight as in this example, an inclining angle α with respect to the tire circumferential direction is not especially limited, but it is preferable that the angle is set to about 5 to 20°, more preferably 10 to 15°. When the main portion 3a is not straight, it is preferable that a straight line connecting the origin N1 and the terminal end N2 is set to the above-mentioned angle α. If the angle α of the main portion 3a is less than 5°, the rigidity of the rib portions 6a and 6b is prone to be large, and the initial response at the time of turning on an icy road is prone to deteriorate. If the angle exceeds 20° on the contrary, the rigidity of the rib portions 6a and 6b is prone to be excessively small, and there is the adverse possibility that deviated friction is generated or the steering stability is deteriorated.

The auxiliary portion 3b has a length in the tire circumferential direction smaller than that of the main portion 3a, and extends on the line F in the tire circumferential direction from the terminal end N2 passing through the origin N1. The auxiliary portion 3b in this example comprises only the axial direction component extending along the tire axial direction. Therefore, the auxiliary portion 3b does not substantially have a component in the tire circumferential direction. The auxiliary portion 3b may be constituted by various straight lines, curves or combinations thereof, only if the auxiliary portion 3b extends on the line F in the tire circumferential direction from the terminal end N2 passing through the origin N1. The length of the auxiliary portion 3b in the tire axial direction is substantially equal to a length of the axial direction component of the main portion 3a. With this design, the groove edge line 3E in this embodiment is formed into a so-called sawtooth-like shape when the entire groove edge line 3E is viewed, and this can optimize the rigidity of the rib portions 6a and 6b. It is of course possible that the outer edges of the rib portions 6a and 6b in the tire axial direction can be constituted by not only the illustrated straight lines, but also various shapes.

In the present invention, a tire circumferential direction length La of the main portion 3a is limited to 60% or higher of a tire circumferential direction length Pa of the reference pitch P, but more preferably 80% or higher, and more preferably 100%, and in this embodiment, the tire circumferential direction length La is substantially 100%. If the tire circumferential direction length La of the main portion 3a is less than 60% of the tire circumferential direction length Pa of the reference pitch P, the rigidity variation of the rib portions 6a and 6b on a road surface having a low coefficient of friction is increased, the torsion deformation is deteriorated, and adhesion of the tread surface with respect to a road surface is deteriorated.

In this embodiment, in the groove edge lines 3E and 3E on the right and left sides of the central vertical groove 3, the tire circumferential direction lengths Pa of the reference pitch P are the same, and the main portions 3a are inclined in the same direction, i.e., the tire circumferential direction, and the phase of the reference pitch P deviates in position in the tire circumferential direction. With this design, in the central vertical groove 3, groove width wide portions 12 formed between auxiliary portions 3b and 3b which are opposed to each other in the tire circumferential direction on the opposite sides of the tire equator C, and groove width narrow portions 13 formed between the main portions 3a and 3a on the opposite sides of the tire equator C are alternately repeated in the tire circumferential direction.

When running on a snow road, such a central vertical groove 3 can form a large snow column by pushing and treading snow in the groove width wide portion 12, and the vehicle can run while shearing the snow column by the auxiliary portion 3b. At that time, the greater the snow column is, the greater the shear force becomes. Therefore, according to the tire of the present embodiment, the driving force and braking force on a snowy road can be increased. If the tire circumferential direction length La of the main portion 3a is less than 60% of the tire circumferential direction length of the reference pitch P, there is a tendency that the difference of snow columns formed by the groove width wide portion 12 and narrow portion 13 becomes small, and great snow column shear effect can not be obtained.

A minimum groove width W2 of the groove width narrow portion 13 is not especially limited, but it is preferable that the minimum groove width W2 is 2 to 7% of the nominal width of the tire, and more preferably 3 to 5%. If the minimum groove width W2 of the groove width narrow portion 13 is less then 2% of the nominal width of the tire, it is difficult to form the snow column for enhancing the driving performance in the groove width narrow portion 13, and there is a tendency that this does not contribute to the enhancement of the driving force. If the minimum groove width W2 of the groove width narrow portion 13 exceeds 7% of the nominal width of the tire, there is an inconvenience that since the land ratio becomes small, the driving performance on a frozen road is prone to deterioration. In the central vertical groove 3, since the groove width of the groove width narrow portion 13 is small, it is very difficult to form the snow column, but by limiting the groove width of this portion, it is possible to enhance the driving force on a snowy road more effectively.

Further, maximum groove width W1 of the groove width wide portion 12 is not especially limited either, but in order to form a large snow column and to obtain the driving force on the snow road effectively, it is preferable that the maximum groove width W1 is 1.5 to 2.5 times of the minimum groove width W2 of the groove width narrow portion 13, and more preferably 1.8 to 2.2 times. A length K of the groove width wide portion 12 in the tire circumferential direction is equal to a deviation amount in phase of the reference pitch P in the opposite side groove edge lines 3E and 3E. From the above-mentioned view point, it is preferable that the length K is 20 to 70% of the tire circumferential direction length La of the reference pitch P, more preferably 20 to 40%. A groove depth of the central vertical groove 3 is not especially limited, but it is preferable that the depth is about 8 to 12 mm, more preferably about 9 to 11 mm.

It is preferable that the tire circumferential direction length La of the reference pitch P is set such that 50 or more groove width wide portions 12 are formed on one round of the tire 1, or three or more reference pitches P exist in each groove edge line 3E in the ground-contact surface of the tire.

Figure 4:
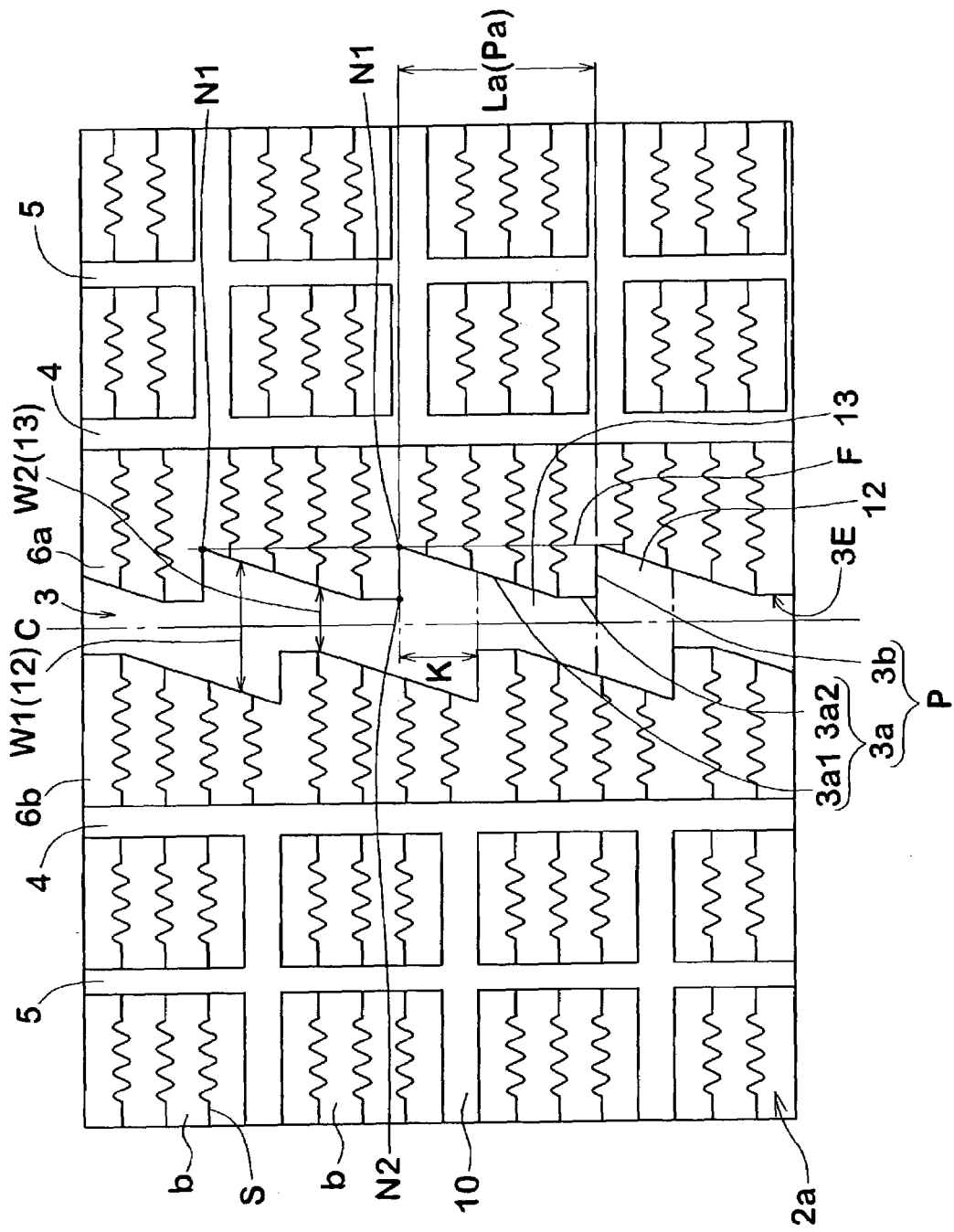
FIG. 4 is a development view of a tread pattern of the winter tire showing another embodiment of the invention.

FIG. 4 shows another embodiment of the invention.

In this example, the main portion 3a comprises an inclining component 3a1, which is extended straight with respect to the tire circumferential direction from the origin N1 and is inclined, and a circumferential direction component 3a2 which is extended from the other end of the inclining component 3a1 to the terminal end N2 along the tire circumferential direction. When a portion of the groove edge line 3E which is closest to the tire equator is continuously in the tire circumferential direction, the terminal end N2 is a point which is furthest from the origin N1. In this manner, the main portion 3a can comprise two or more components having different angles with respect to the tire circumferential direction.

Figure 5:
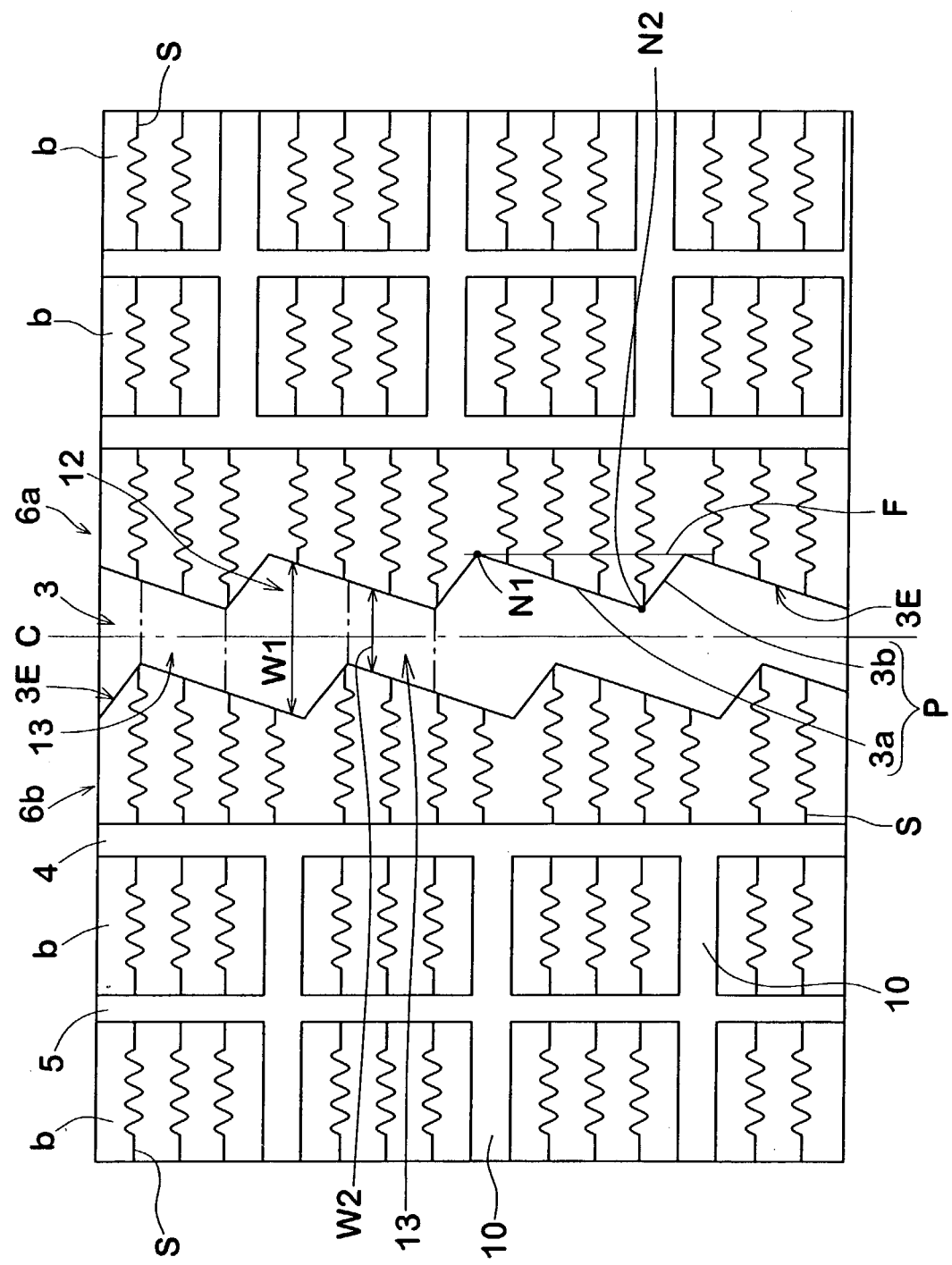
FIG. 5 is a development view of the tread pattern of the winter tire showing further another embodiment of the invention.

FIG. 5 shows further another embodiment of the present invention. In this example, the reference pitch P comprises an inclining component in which the auxiliary portion 3b is directed in the opposite direction from the main portion 3a and inclined with respect to any of the tire axial direction and the tire circumferential direction.

Figure 6:
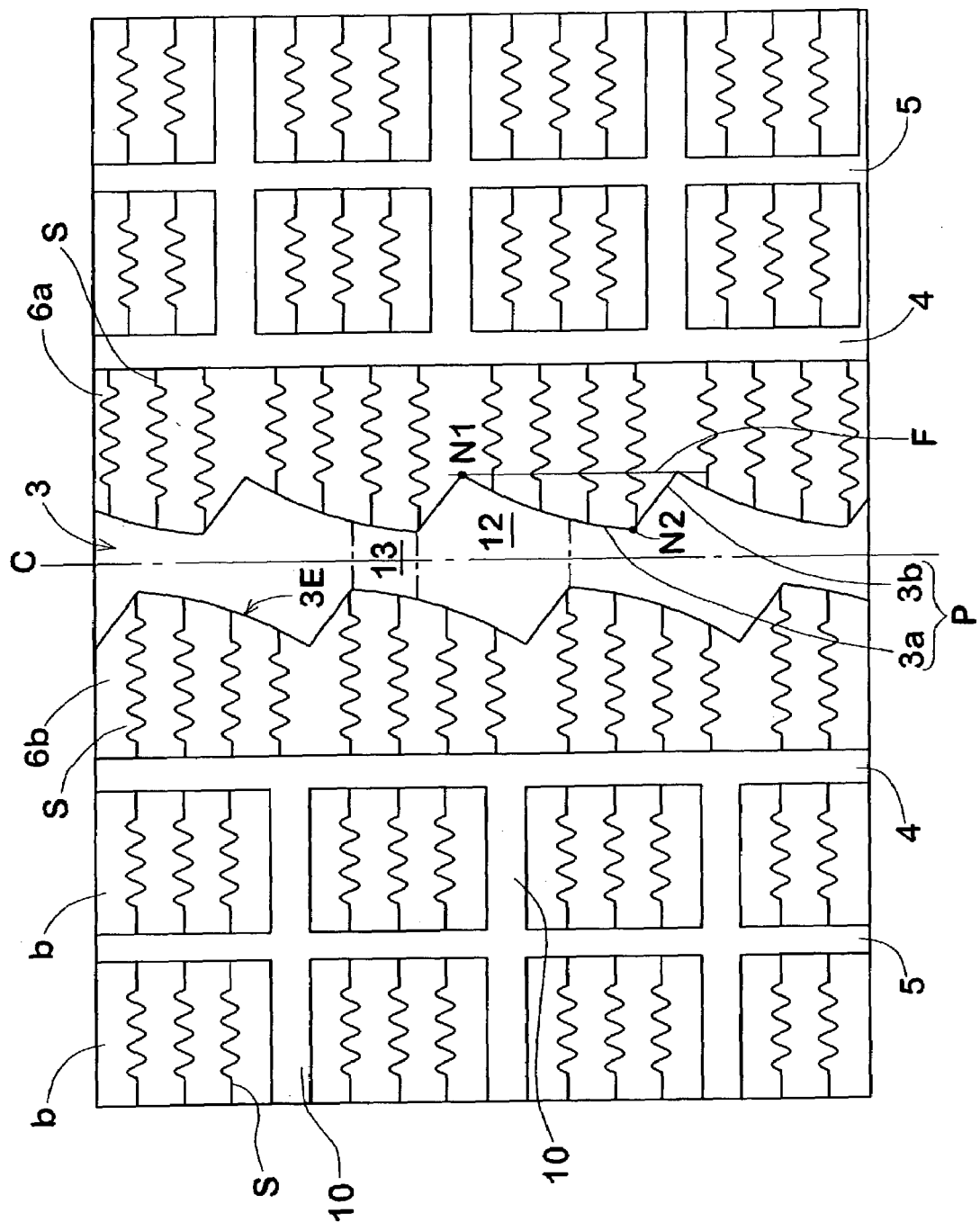
FIG. 6 is a development view of the tread pattern of the winter tire showing further another embodiment of the invention.

FIG. 6 shows a further embodiment of the present invention. In this example, the main portion 3a and the auxiliary portion 3b are arc curves in the groove edge line 3E.

Figure 7:
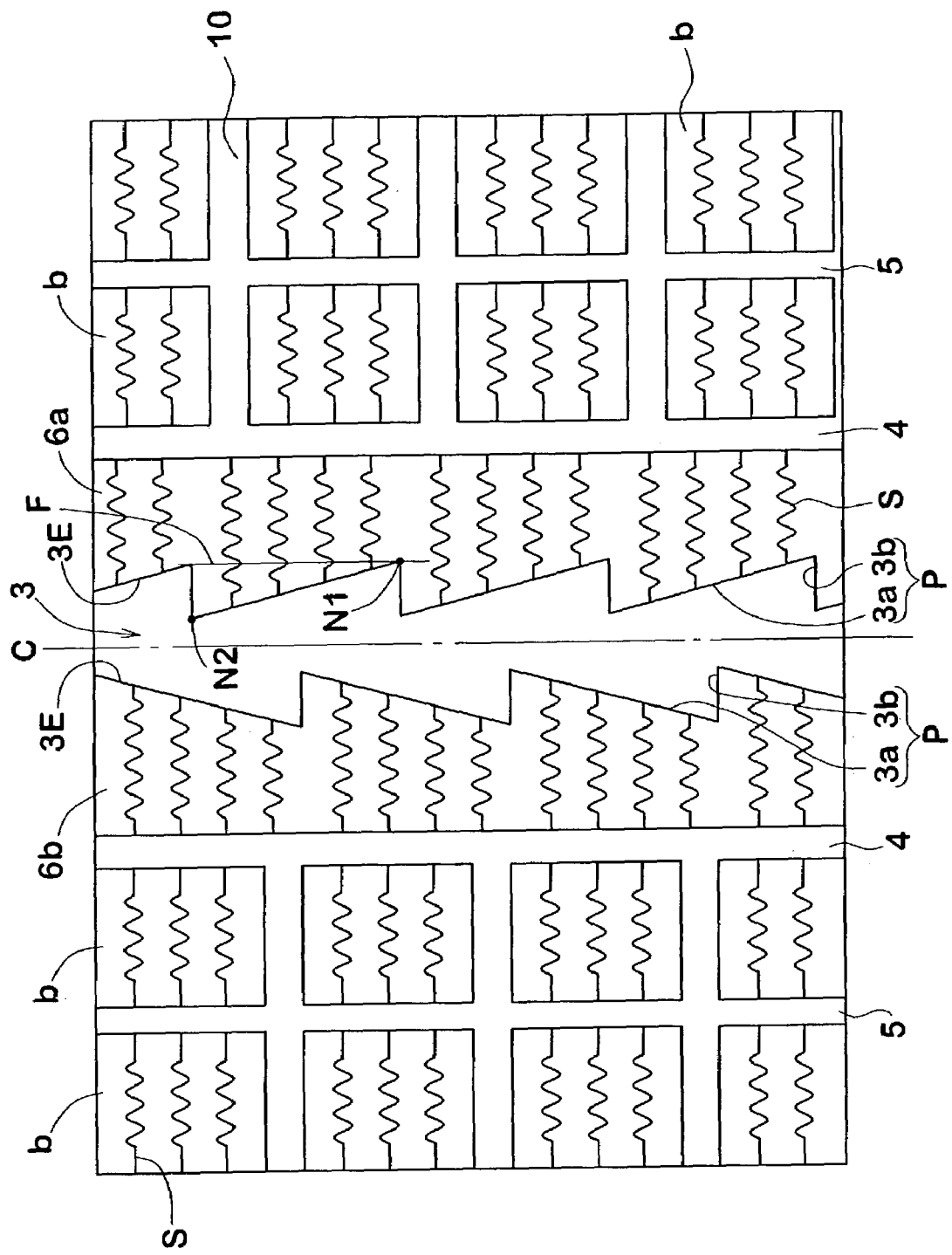
FIG. 7 is a development view of the tread pattern of the winter tire showing further another embodiment of the invention.
Figure 8:
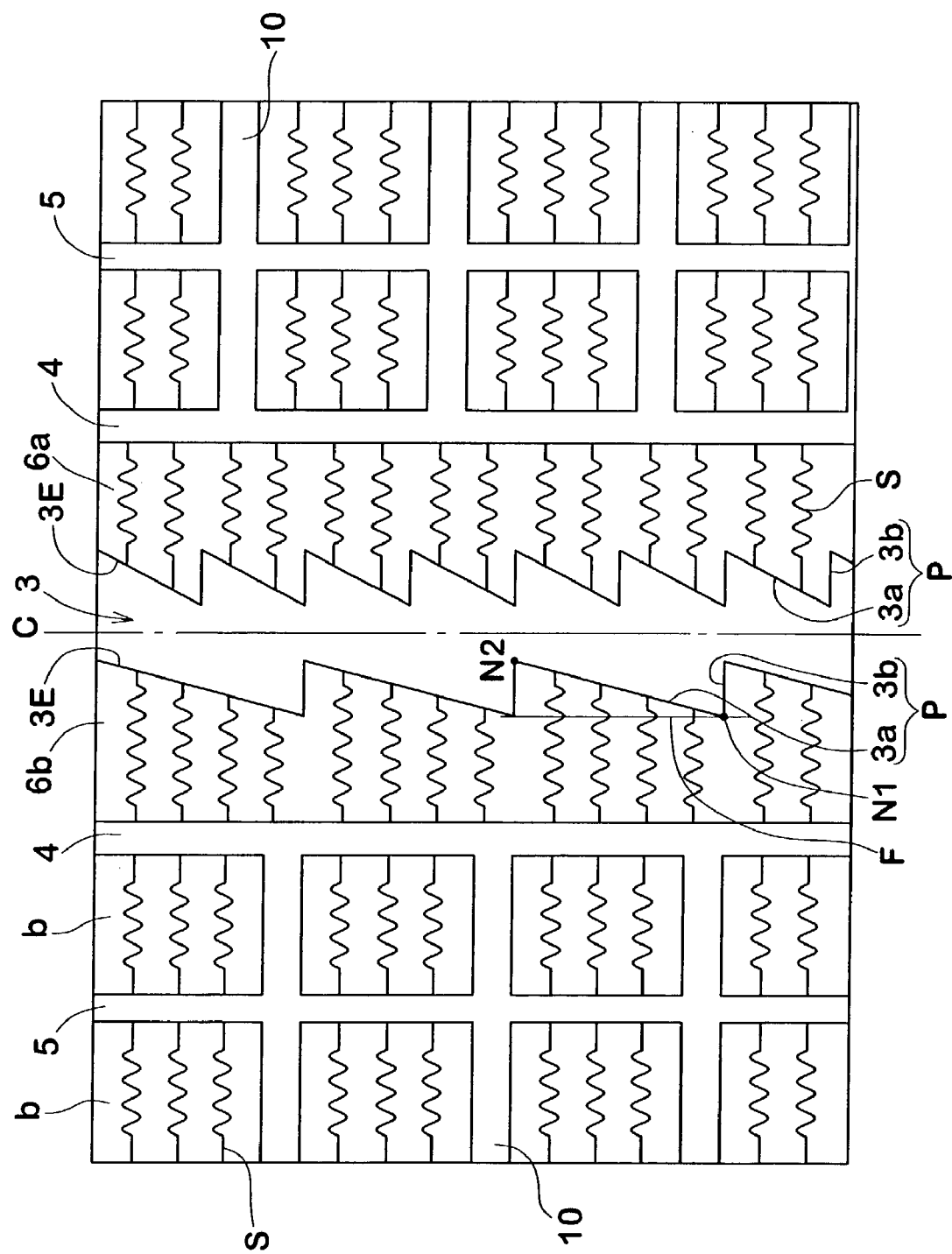
FIG. 8 is a development view of the tread pattern of the winter tire showing further another embodiment of the invention.

FIGS. 7 and 8 show still further embodiments of the present invention. In FIG. 7, inclinations of the main portions 3a of the left and right groove edge lines 3E ane 3E are in opposite directions. In FIG. 8, the tire circumferential direction lengths of the reference pitches P in the left and right groove edge lines 3E and 3E have a different configuration.

EMBODIMENT

Winter tires having a tire size of 195/65R14 were prototyped in accordance with the specifications (structures are common except pattern) shown in Table 1, and the tires were mounted to all wheels of a Japanese FR passenger car having a piston displacement of 2000 cc, and a running test was carried out on a snow circuit test course. The tests carried out included starting, state of acceleration, braking state, response at the time of cornering, and running performance through the entire distance in deep snow using 10 point scoring by a driver's sensory evaluation. The tire rim used was 6·½ JJ and the internal tire pressure was 200 kPa.

Tires of the embodiments 1 to 3, respectively, employed the patterns shown in FIGS. 1, 4 and 5. Tires of comparative examples 1 to 3, respectively, employed the patterns shown in FIGS. 9 and 10. The results of the test are shown in Table. 1.

TABLE 1

Figure 9:
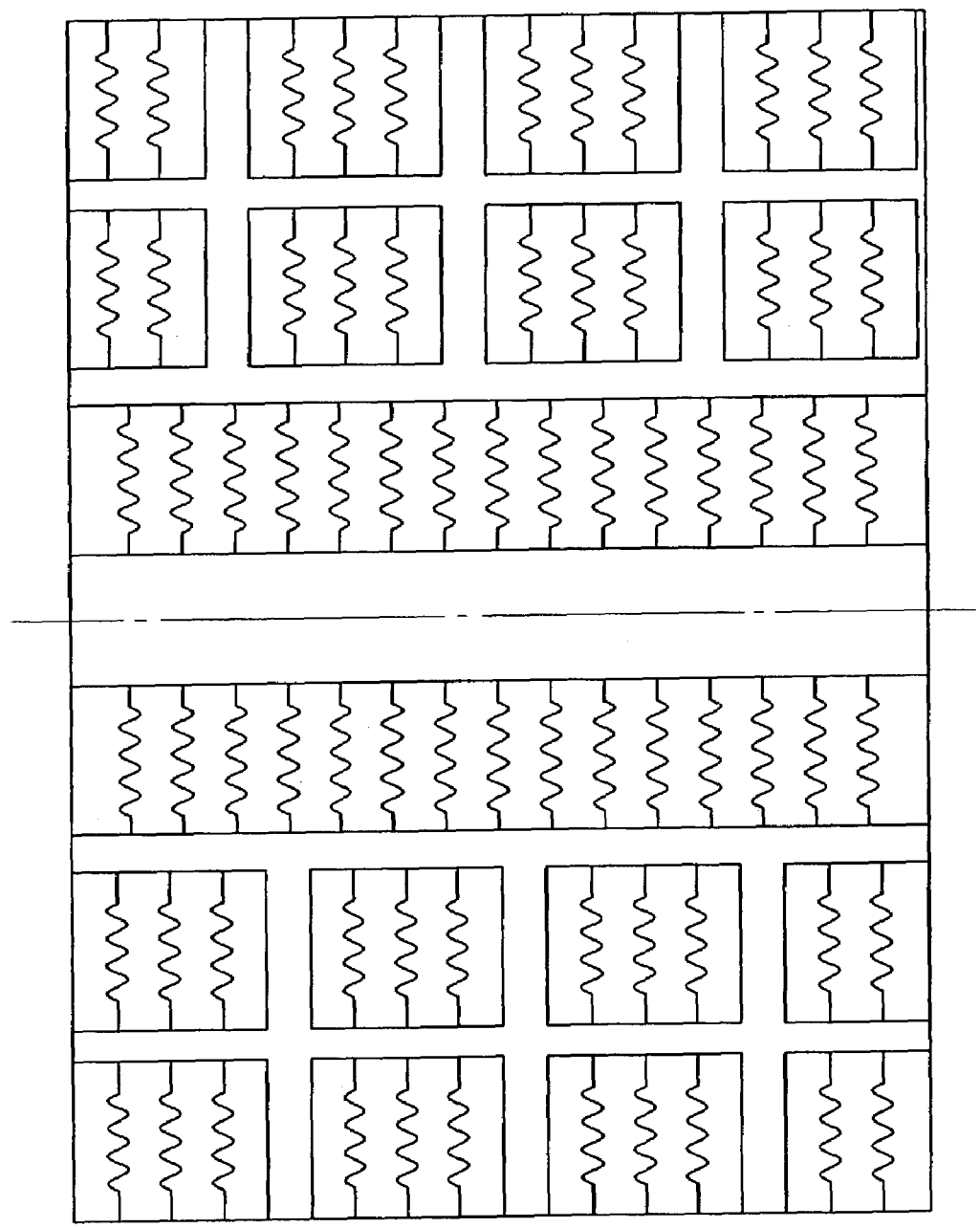
FIG. 9 is a development view of the tread patterns of tires of comparative examples 1 and 2.
Figure 10:
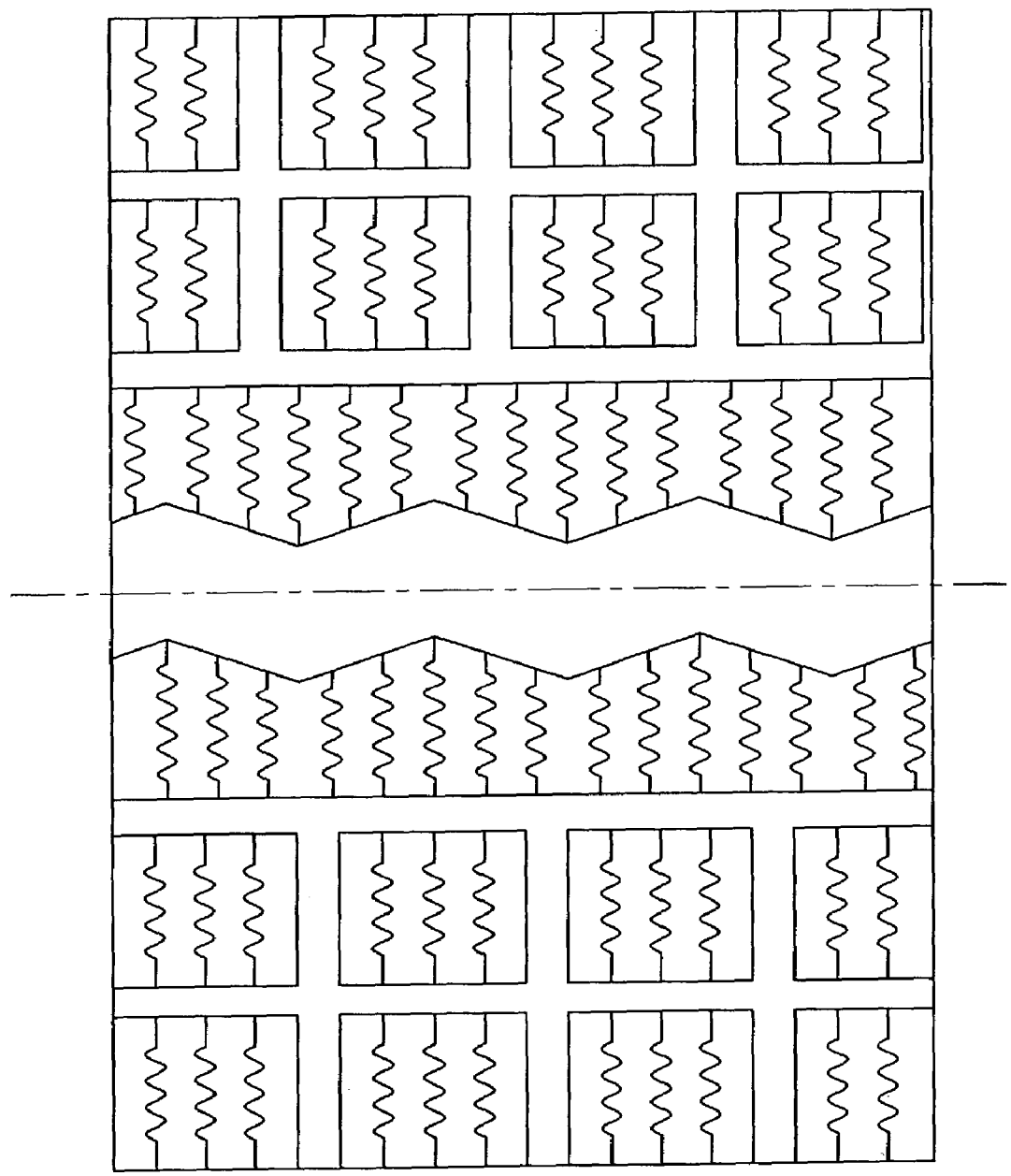
FIG. 10 is a development view of the tread pattern of a tire of a comparative example 3.

|  | Comparative example 1 FIG. 9 | Comparative example 2 FIG. 9 | Comparative example 3 FIG. 10 | Embodiment 1 FIG. 1 | (Tire size 195/65R15) Embodiment 2 FIG. 4 | Embodiment 3 FIG. 5 |
|---|---|---|---|---|---|---|
| Figure showing pattern | | | | | | |
| Angle with respect to tire circumferential direction of main portion [°] | — | — | 20 | 15 | 18.0 | 18 |
| Length of main portion in tire circumferential direction [mm] | — | — | 33 | 33 | 33 | 28 |
| Angle with respect to tire circumferential direction of auxiliary portion [°] | — | — | −20 | 90 | 90 | 50 |
| Length of auxiliary portion in tire circumferential direction [mm] | — | — | 33 | 0 | 0 | 5 |
| Ratio (La/Pa) [%] | — | — | 50 | 100 | 85 | 85 |
| Groove width W2 of narrow groove width portion [mm] | 15 | 22 | 18 | 12 | 10 | 12 |
| Groove width W1 of wide groove width portion [mm] | 15 | 22 | 18 | 20 | 20 | 22 |
| Length of wide groove width portion in tire circumferential direction [mm] | 0 | 0 | 0 | 12 | 12 | 17 |
| Ratio (K/Pa) [%] | 0 | 0 | 0 | 36 | 36 | 52 |
| Results of test  Start, acceleration performance | 6 | 6 | 6 | 7 | 7 | 7 |
| Braking performance | 6 | 6 | 6 | 7 | 7 | 7 |
| Response at the time of cornering | 6 | 6 | 7 | 7 | 7 | 7 |
| Running performance through whole distance in deep snow | 6 | 7 | 6 | 7 | 7 | 7 |

As a result of the test, it could be confirmed that the tires of the embodiments 1 to 3 are more excellent than tires of the comparative examples. Next, based on the tire of the embodiment 1, tires whose minimum groove widths of the groove width narrow portions were variously changed were prototyped, and the same test was carried out. The results of the test are shown in Table 2.

TABLE 2

|  | Embodiment 1 | Embodiment 4 | Embodiment 5 | Embodiment 6 | (Tire size 195/65R15) Embodiment 7 | Embodiment 8 |
|---|---|---|---|---|---|---|
| Ratio (groove width (mm) of narrow width portion)/nominal width (mm) of tire) [%] | 3.0 | 3.5 | 4.0 | 4.5 | 5.0 | 5.5 |
| Results of test  Start, acceleration performance | 7 | 7 | 7 | 7 | 7 | 7 |
| Braking performance | 7 | 7 | 7 | 7 | 7 | 7 |
| Response at the time of cornering | 7 | 7 | 7 | 7 | 7 | 7 |
| Running performance through whole distance in deep snow | 6 | 6 | 7 | 7 | 8 | 8 |

As explained above, according to the pneumatic tire of the present invention, rib portions having sipes and continuously extending substantially in a tire circumferential direction are formed on opposite sides of a central vertical groove which continuously extends along the tire equator in the tire circumferential direction. Such a rib portion can form a contact portion which is long in the tire circumferential direction in a tread surface central portion having high ground-contact pressure, and good driving performance on a frozen road can be maintained. Further, by limiting the shape of the groove edge line of the central vertical groove, it is possible to appropriately lower the rigidity of the rib portion on an icy road, and even when the slip angle is given, the following ability with respect to torsion deformation between the tire and the road surface is enhanced, and thus it is possible to prevent early slip.

Further, when the auxiliary portion comprises only an axial direction component extending in the tire axial direction, the groove edge line has a sawtooth-like shape, and the above effect can further be enhanced.

In addition, the central vertical groove can contain groove width wide portions and groove width narrow portions which are alternately provided in the tire circumferential direction. Therefore, it is possible to push and tread the snow in the groove width wide portion to form a large snow column when running on a snowy road, and the vehicle advances while shearing the column by the groove width narrow portion or the like and as a result, it is possible to increase the driving force on the snowy road.

INDUSTRIAL APPLICABILITY

As described above, the tire of the present invention is capable of preventing the deterioration of the driving performance on a frozen road, and, in fact is capable of enhancing the driving-in-snow performance, especially the driving performance in deep snow, and thus the tire can be advantageously used as a winter tire on an icy road.

The invention claimed is:

1. A winter tire containing a tread surface which is provided with a pair of rib portions having sipes and continuously extending in the tire circumferential direction, said rib portions being provided with grooves which do not completely divide the rib portions, said grooves having a width of 3 mm or less, and a central vertical groove disposed between said pair of rib portions and continuously extending on a tire equator in a tire circumferential direction, wherein side groove edge lines defined as lines in which groove wall surfaces on opposite sides of said central vertical groove intersect with a tread surface, are composed of reference pitches repeated in the tire circumferential direction, each of said reference pitches comprises a main portion including at least an inclining component which inclines with respect to the tire circumferential direction, and extending from an origin being at an outermost side in the tire axial direction to a terminal end being closest to the tire equator, and an auxiliary portion consisting of an axial direction component which extends in parallel with the tire axial direction from said terminal end to a line in the tire circumferential direction passing through said origin so that said groove edge line has a saw-tooth shape, and a length (Pa) of said reference pitch in the tire circumferential direction is larger than a pitch (L1) between said sipes in the tire circumferential direction.

2. The winter tire according to claim 1, wherein in the opposite side of said groove edge lines, the length (Pa) of the reference pitches are the same, and said main portions are inclined in the same direction, the phase of said reference pitch is being deviated in position in the tire circumferential direction, groove width wide portions are formed between said auxiliary portions which are opposed to each other in the tire circumferential direction on the opposite sides of the tire equator, and groove width narrow portions which are formed between said main portions on the opposite sides of the tire equator are alternately repeated in the tire circumferential direction, and a minimum groove width (W2) of said groove width narrow portion in the tire axial direction is 2 to 7% of a nominal width of the tire.

3. The winter tire according to claim 2, wherein a length (K) of said groove width wide portion in the tire circumferential direction is 0.2 to 0.7 times the length (Pa) of said reference pitch in the tire circumferential direction.

4. The winter tire according to claim 2, wherein in the opposite side of said groove edge lines, the length (Pa) of the reference pitches are the same, and said main portions are inclined in the same direction, the phase of said reference pitch is being deviated in position in the tire circumferential direction, groove width wide portions which are formed between said auxiliary portions which are opposed to each other in the tire circumferential direction on the opposite sides of the tire equator, and groove width narrow portions formed between said main portions on the opposite sides of the tire equator being alternately repeated in the tire circumferential direction, a maximum groove width (W1) of said groove width wide portion in the tire axial direction is 1.5 to 2.5 times of a minimum groove width (W2) of said groove width narrow portion in the tire axial direction.

5. The winter tire according to claim 1, wherein in the opposite side of said groove edge lines, length (Pa) of the reference pitches are the same, and said main portions are inclined in the same direction, the phase of said reference pitch being deviated in position in the tire circumferential direction, groove width wide portions are formed between said auxiliary portions which are opposed to each other in the tire circumferential direction on the opposite sides of the tire equator, and groove width narrow portions which are formed between said main portions on the opposite sides of the tire equator are alternately repeated in the tire circumferential direction, and a maximum groove width (W1) of said groove width wide portion in the tire axial direction is 1.5 to 2.5 times of a minimum groove width (W2) of said groove width narrow portion in the tire axial direction.

6. The winter tire according to claim 5, wherein a length of said groove width wide portion in the tire circumferential direction is 0.2 to 0.7 times the length (Pa) of said reference pitch in the tire circumferential direction.

7. The winter tire according to claim 1, wherein the sipes or the grooves having a width of 3 mm or less are not opened at a position of said origin.

8. The winter tire according to claim 1, wherein an outer side edge line of said rib portion in the tire axial direction is a straight line extending in the tire circumferential direction.

9. The winter tire according to claim 1, wherein at least one row of blocks having sipes and arranged in the tire circumferential direction is further provided axially outside of said rib portion, and a ratio (L2/L1) of a pitch (L2) between the sipes of said blocks in the tire circumferential direction and said pitch (L1) between the sipes of said rib portion is from 1.1 to 1.2.

10. The winter tire according to claim 1, wherein said main portion comprises said inclining component which inclines with respect to the tire circumferential direction and which extends straightly from said origin, and a circumferential direction component which extends substantially straight from said inclining component to said terminal end in the tire circumferential direction.

11. The winter tire according to claim 1, wherein the inclining component of the main portion is curved.

12. The winter tire according to claim 1, wherein the main portions on the opposite sides of the tire equator are inclined in the opposite direction to each other.

13. The winter tire according to claim 1, wherein the length (Pa) of the reference pitches on the opposite sides of the tire equator are different to each other.

14. The winter tire according to claim 1, wherein in the opposite side of said groove edge lines, the length (Pa) of the reference pitches are the same, and said main portions are inclined in the same direction, the phase of said reference pitch being deviated in position in the tire circumferential direction, groove width wide portions are formed between the auxiliary portions which are opposed to each other in the tire circumferential direction on the opposite sides of the tire equator, groove width narrow portions which are formed between said main portions on the opposite sides of the tire equator are alternately repeated in the tire circumferential direction, and said groove width wide portions has a shape of a parallelogram including a pair of sides parallel with the tire axial direction so as to provide a groove width in the tire axial direction which is substantially constant.

* * * * *